(12) United States Patent
Ashbrook

(10) Patent No.: US 9,269,325 B2
(45) Date of Patent: Feb. 23, 2016

(54) TRANSITIONING PERIPHERAL NOTIFICATIONS TO PRESENTATION OF INFORMATION

(71) Applicant: Nokia Technologies Oy, Espoo (FI)

(72) Inventor: Daniel L. Ashbrook, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 487 days.

(21) Appl. No.: 13/632,060

(22) Filed: Sep. 30, 2012

(65) Prior Publication Data

US 2014/0092099 A1 Apr. 3, 2014

(51) Int. Cl.
| | |
|---|---|
| *G06G 5/00* | (2006.01) |
| *G06T 13/80* | (2011.01) |
| *G06F 1/16* | (2006.01) |
| *G09G 5/00* | (2006.01) |
| *G06F 3/0484* | (2013.01) |

(52) U.S. Cl.
CPC ............... *G09G 5/00* (2013.01); *G06F 1/1647* (2013.01); *G06F 3/04842* (2013.01); *G06T 13/80* (2013.01); *G06F 2203/04804* (2013.01); *G09G 2340/145* (2013.01)

(58) Field of Classification Search
None
See application file for complete search history.

(56) References Cited

U.S. PATENT DOCUMENTS

| | | | |
|---|---|---|---|
| 6,618,470 | B2 | 9/2003 | Shibuya |
| 7,970,439 | B2 | 6/2011 | Steer et al. |
| 2001/0002122 | A1* | 5/2001 | Vong et al. ............... 340/691.1 |
| 2009/0249247 | A1* | 10/2009 | Tseng et al. ............... 715/808 |
| 2011/0012875 | A1* | 1/2011 | Sakakibara et al. ......... 345/204 |
| 2012/0001748 | A1 | 1/2012 | Ladouceur et al. |

FOREIGN PATENT DOCUMENTS

WO WO 2009/126135 A1 10/2009

OTHER PUBLICATIONS

How to Change Lights on the Sony W580i (undated) [online] [retrieved Oct. 24, 2012]. Retrieved from the Internet: <URL: http://www.ehow.com/how_7317049_change-lights-sony-w580i.html>. 3 pages.

T-Mobile Sidekick 4G dated Apr. 20, 2011 [online] [retrieved Oct. 24, 2012]. Retrieved from the Internet: <URL: http://www.laptopmag.com/review/cellphones/t-mobile-sidekick-4g.aspx>. 11 pages.

(Continued)

*Primary Examiner* — Zhengxi Liu
(74) *Attorney, Agent, or Firm* — Alston & Bird LLP

(57) ABSTRACT

Methods, apparatuses, and computer program products are herein provided for transitioning from presentation of a peripheral notification on a first display to presentation of information on a second display. A method may include causing presentation of a peripheral notification on a first display. The method may further include receiving an indication of a selection associated with the peripheral notification. The method may further include causing presentation of a transition animation in response to receiving the indication. The transition animation indicates a transition from the presentation of the peripheral notification to presentation of information associated with the peripheral notification. The method may further include causing presentation of the information on a second display. Corresponding apparatuses and computer program products are also provided.

9 Claims, 19 Drawing Sheets

(56) References Cited

OTHER PUBLICATIONS

Video: This Pair of Glasses Is Actually A Personal Navigation System (dated Aug. 3, 2010) [online] [retrieved Oct. 24, 2012]. Retrieved from the Internet: <URL: http://techcrunch.com/2010/08/03/video-this-pair-of-glass-is-actually-a-personal-navigation-system/>. 2 pages.

The Tribune, Chandigarh, India—Business (dated Dec. 4, 2003) [online] [retrieved Oct. 24, 2012]. Retrieved from the Internet: <URL: http://www.tribuneindia.com/2003/20031204/biz.htm>. 10 pages.

Costanza, E. et al., *eye-q: Eyeglass Peripheral Display for Subtle Intimate Notification*, Proceedings of Conference o Human-Computer Interaction With Mobile Devices and Services, MobileHCI 2006 (Sep. 2006), 8 pages.

EPSON Moverio BT-100—Android Powered Interactive Display—Epson America, Inc. (undated) [online] [retrieved Oct. 24, 2012]. Retrieved from the Internet: <URL: http://www.epson.com/cig-bin/Store/jsp/Moverjo/Home.do>. 7 pages.

\* cited by examiner

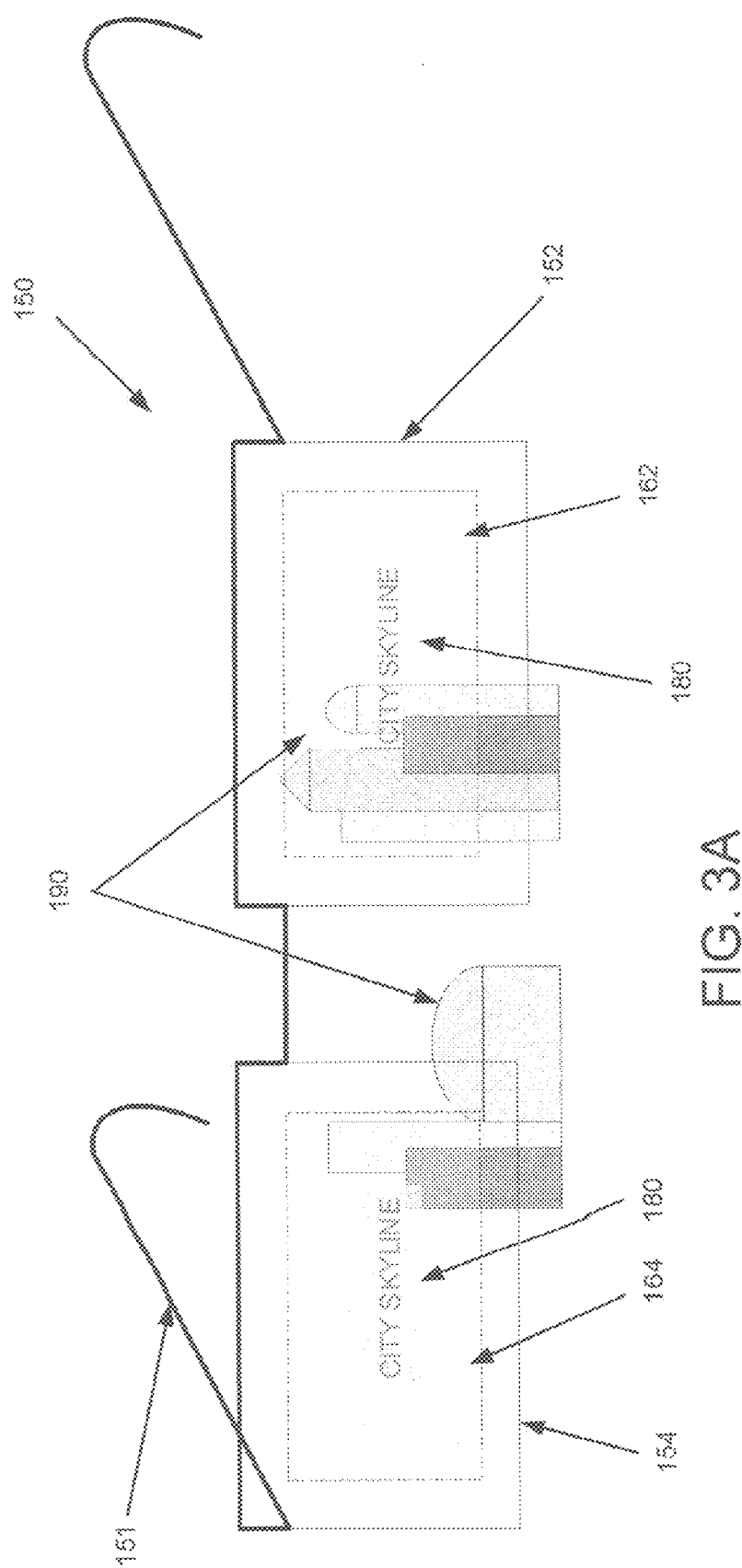

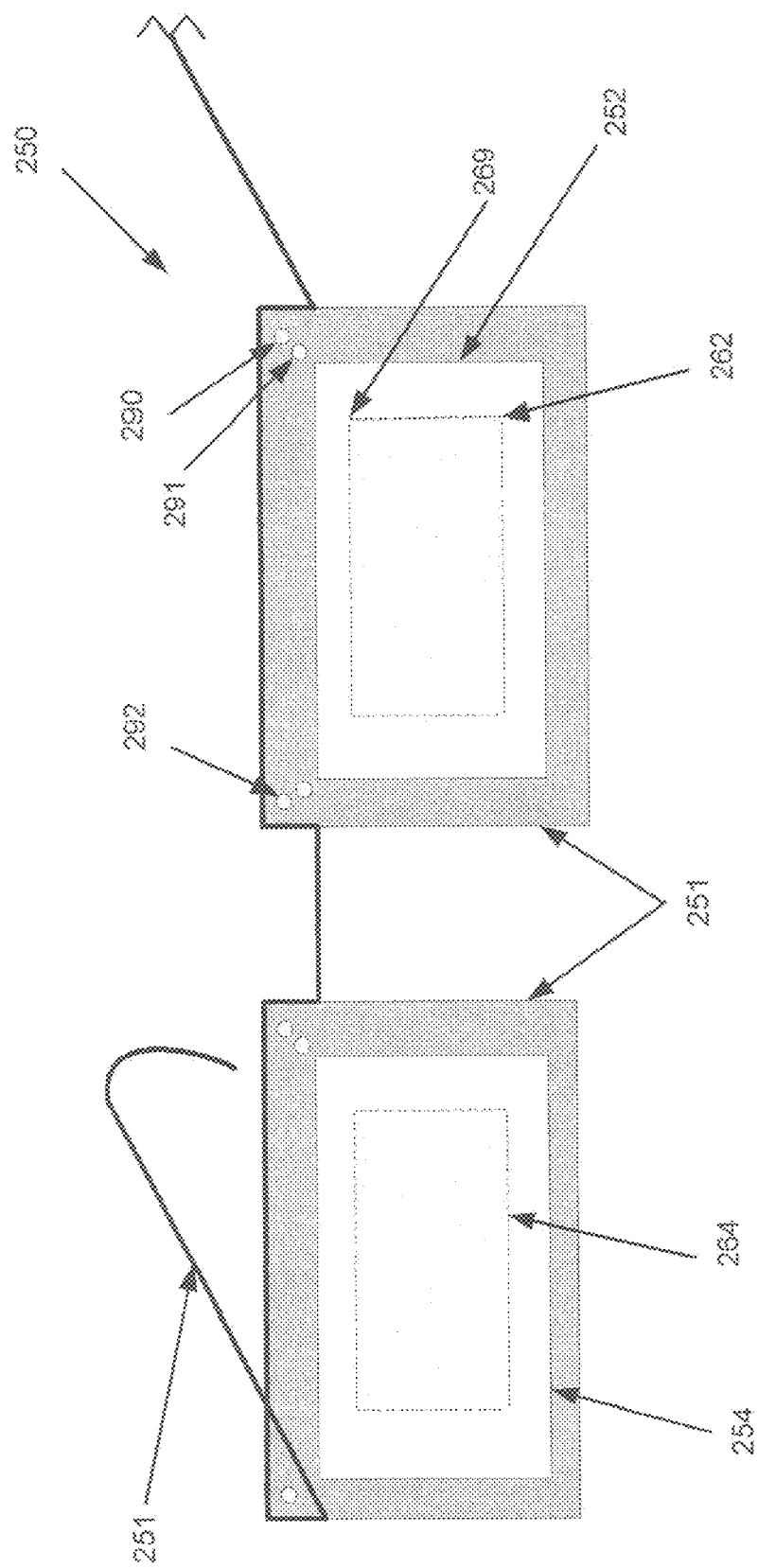

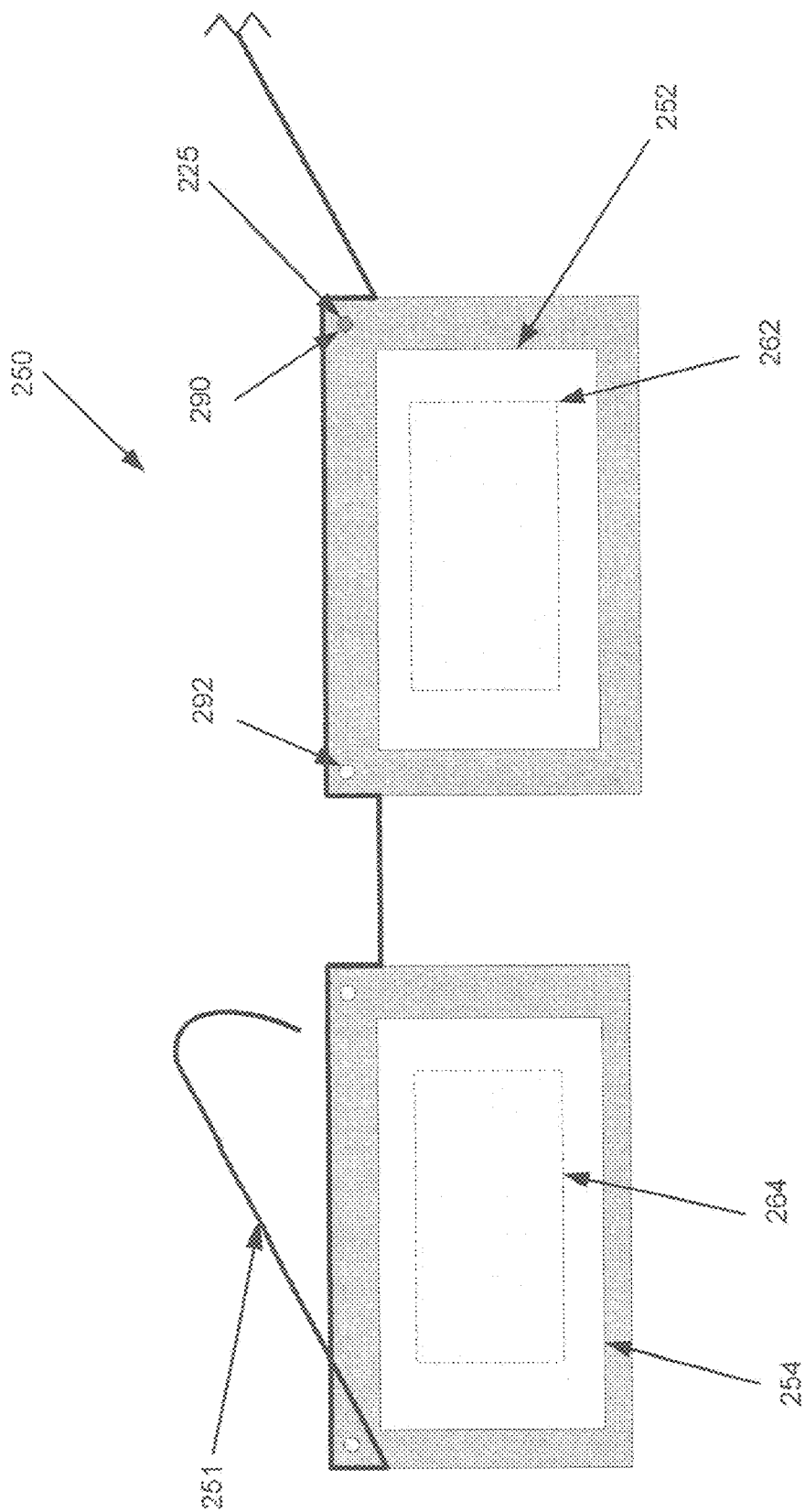

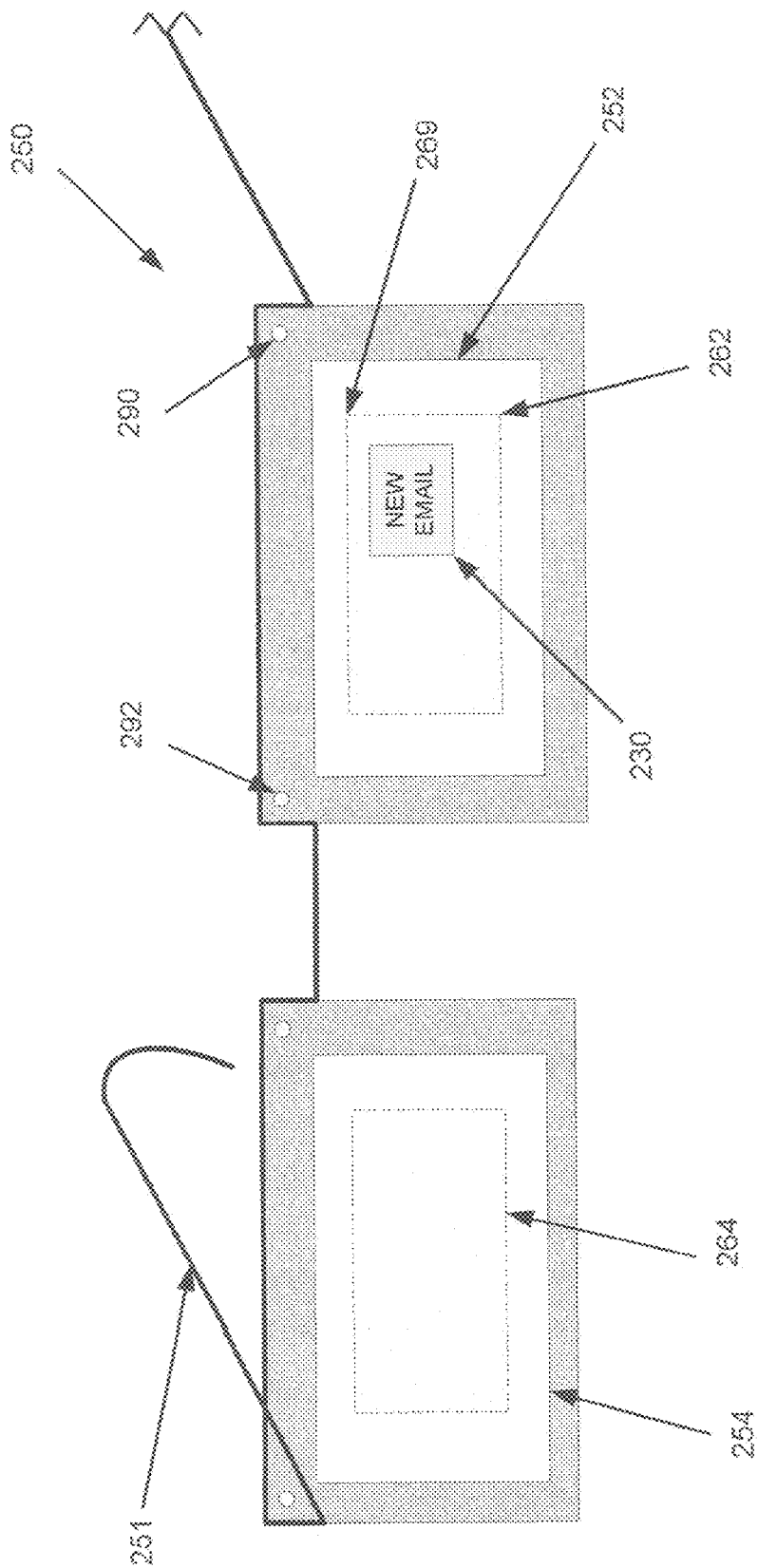

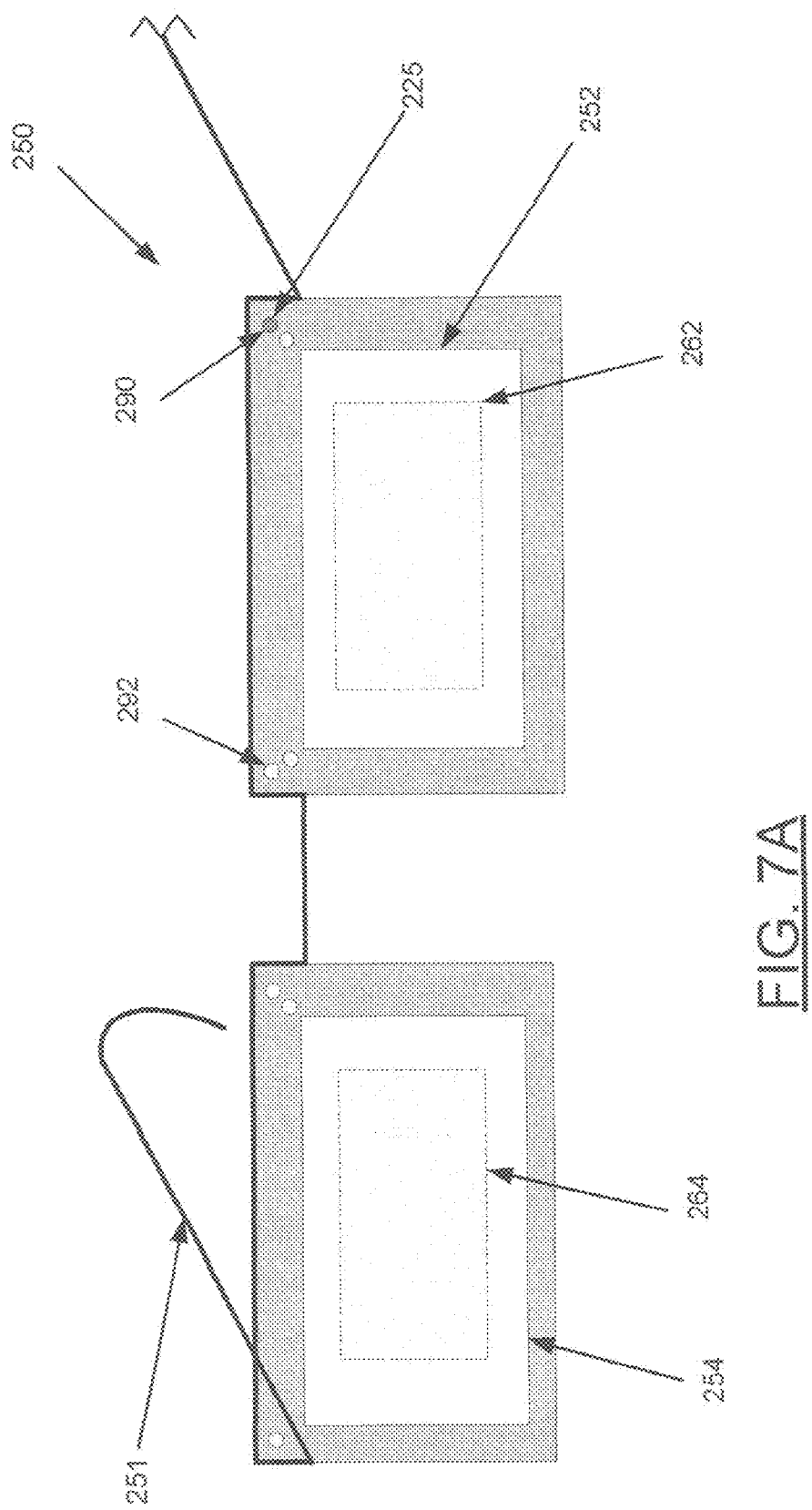

TRANSITIONING PERIPHERAL NOTIFICATIONS TO PRESENTATION OF INFORMATION

TECHNOLOGICAL FIELD

Example embodiments of the present invention relate generally to user interface technology and, more particularly, relate to methods, apparatuses, and computer program products for transitioning from presentation of a peripheral notification on a first display to presentation of information on a second display.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

BRIEF SUMMARY

Increased functionally of these mobile computing devices has led to users being able to perform multiple operations on one device. Each of these operations may have corresponding notifications that may be presented to the user. Additionally, some mobile computing devices may use peripheral notifications to inform a user of an event with little interruption for the user. Such a situation may be useful for mobile computing devices that incorporate pass-through displays (e.g., head-mounted displays, augmented reality glasses, etc.). However, as noted above, display space may be limited and the user may be constantly inundated with information such that it may be difficult to mentally recognize what information is actually associated with a peripheral notification.

As such, embodiments of the present invention seek to control transitioning from presentation of a peripheral notification on a first display to presentation of information on a second display. In some example embodiments, a device may be configured to determine when a user provides input indicating that she user desires to view the information associated with a peripheral notification. In such an example embodiment, the device may cause presentation of a transition animation from the peripheral notification to the presentation of the information such that the user may easily recognize that the information is associated with the peripheral notification. This enables the use of peripheral notifications, such as for non-intrusive notification, while still enabling the user to determine that the information being presented to them is associated with the peripheral notification.

Embodiments of the present invention provide methods, apparatuses, and computer program products for transitioning from presentation of a peripheral notification on a first display to presentation of information on a second display. In one example embodiment, a method includes causing presentation of a peripheral notification on a first display. The method further includes receiving an indication of a selection associated with the peripheral notification. The method further includes causing presentation of a transition animation in response to receiving the indication. The transition animation indicates a transition from the presentation of the peripheral notification to presentation of information associated with the peripheral notification. The method further includes causing presentation of the information on a second display.

In some embodiments, the second display is separate from the first display. In some embodiments, the first display is disposed proximate at least one edge of the second display.

In some embodiments, the method may further include causing presentation of the transition animation by causing presentation of the information on the second display in an animation series such that the information appears to be moving across the second display. In such an embodiment, presentation of the information in the animation series begins from an edge of the second display that is proximate the first display. Additionally, in some embodiments, the method may further include causing presentations of the information on the second display in the animation series by causing presentation of the information in the animation series such that the information appears to be moving from the first display to the second display. Additionally, in some embodiments, the second display comprises a pass-through display and the first display comprises a display of lower resolution than the second display.

In some embodiments, the method may further include causing presentation of the transition animation by causing presentation of a transition notification on a third display positioned between the first display and the second display. Additionally, in some embodiments, the method may further include causing presentation of the information on the second display by causing presentation of the information on the second display after causing presentation of the transition notification on the third display such that transition notification and the information are presented in series leading from the first display to the second display. Additionally, in some embodiments, the method may further include causing presentation of the transition notification and the information by causing presentation of the transition notification and the information in a time series with a time interval between the transition notification and the information. In such an embodiment, the time interval may be proportionate to a distance between the third display and the second display.

In another example embodiment, an apparatus comprises at least one processor and at least one memory storing computer program code, wherein the at least one memory and stored computer program code are configured, with the at least one processor, to cause the apparatus to cause presentation of a peripheral notification on a first display. The at least one memory and stored computer program code are configured, with the at least one processor, to further cause the apparatus to receive an indication of a selection associated with the peripheral notification. The at least one memory and stored computer program code are configured, with the at least one processor, to further cause the apparatus to cause presentation of a transition animation in response to receiving the indication. The transition animation indicates a transition from the presentation of the peripheral notification to presentation of information associated with the peripheral notification. The at least one memory and stored computer program code are configured, with the at least one processor, to further cause the apparatus to cause presentation of the information on a second display.

In another example embodiment, a computer program product is provided that includes at least one computer-readable storage medium having computer-readable program instructions stored therein. The program instructions of this example embodiment comprise program instructions configured to cause an apparatus to perform a method comprising causing presentation of a peripheral notification on a first display. The method further includes receiving an indication of a selection associated with the peripheral notification. The method further includes causing presentation of a transition animation in response to receiving the indication. The transition animation indicates a transition from the presentation of the peripheral notification to presentation of information associated with the peripheral notification. The method further includes causing presentation of the information on a second display.

In another example embodiment, an apparatus is provided that comprises means for causing presentation of a peripheral notification on a first display. The apparatus further includes means for receiving an indication of a selection associated with the peripheral notification. The apparatus further includes means for causing presentation of a transition animation in response to receiving the indication. The transition animation indicates a transition from the presentation of the peripheral notification to presentation of information associated with the peripheral notification. The apparatus further includes means for causing presentation of the information on a second display.

BRIEF DESCRIPTION OF THE DRAWINGS

Figure 1:
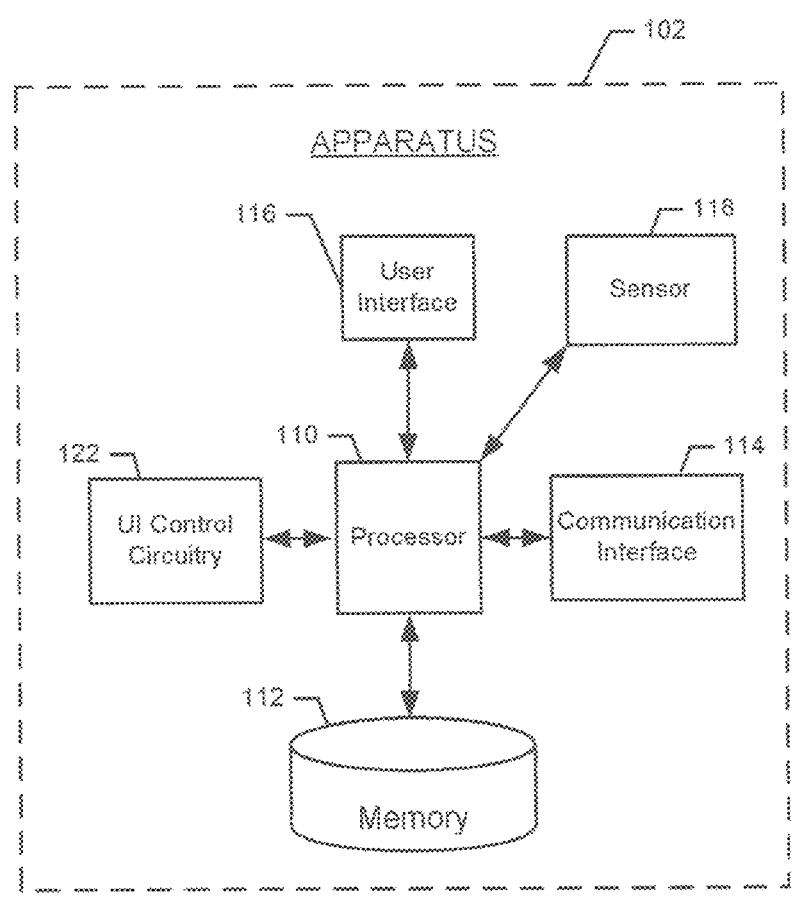
Figure 2:
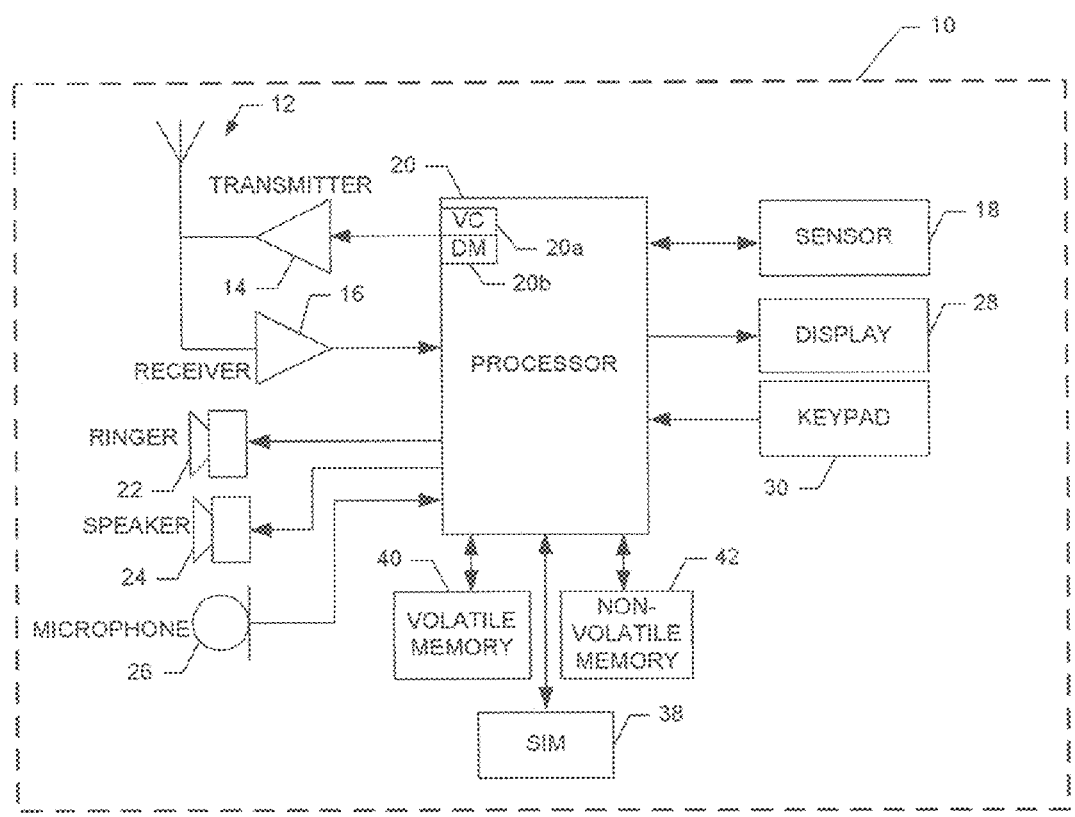
Figure 3B:
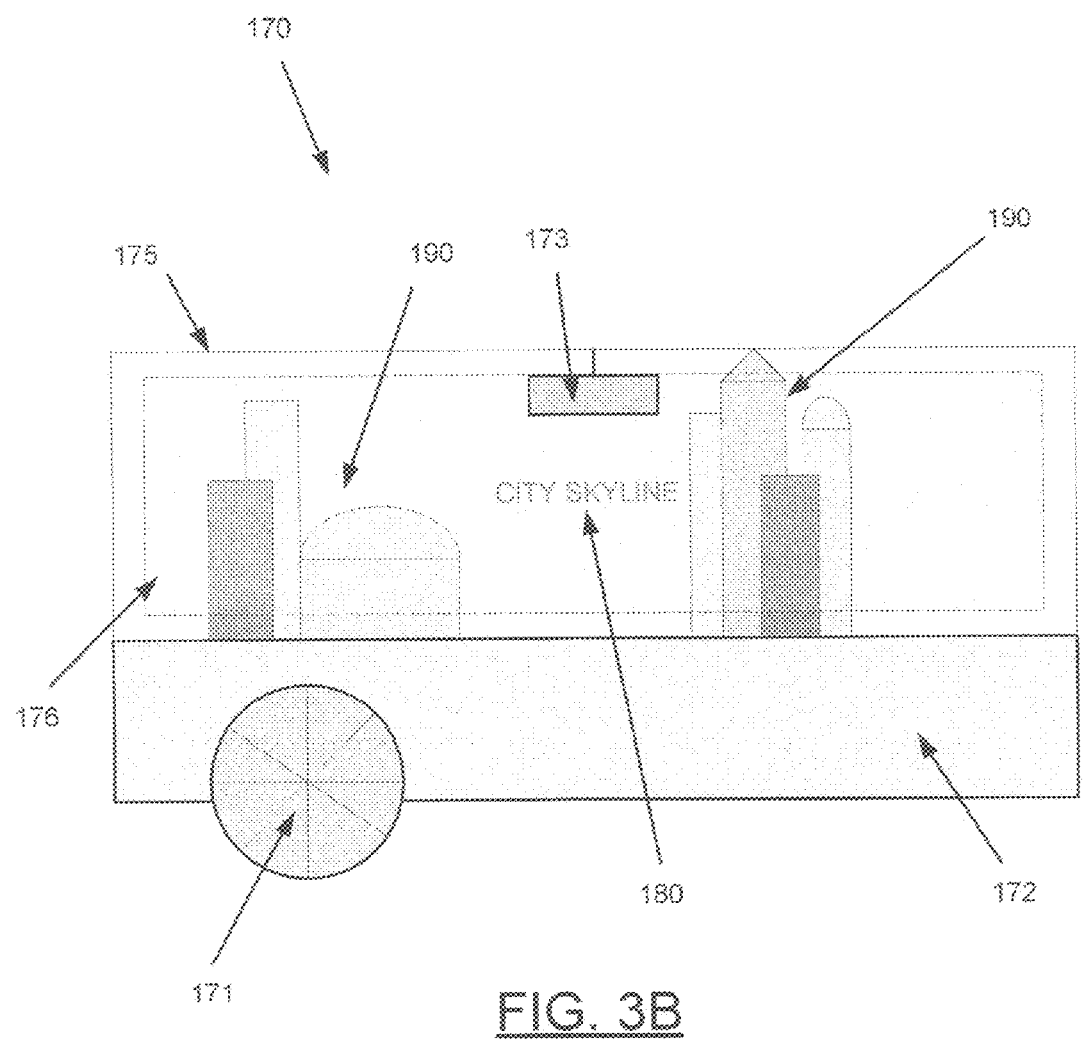
Figure 4A:
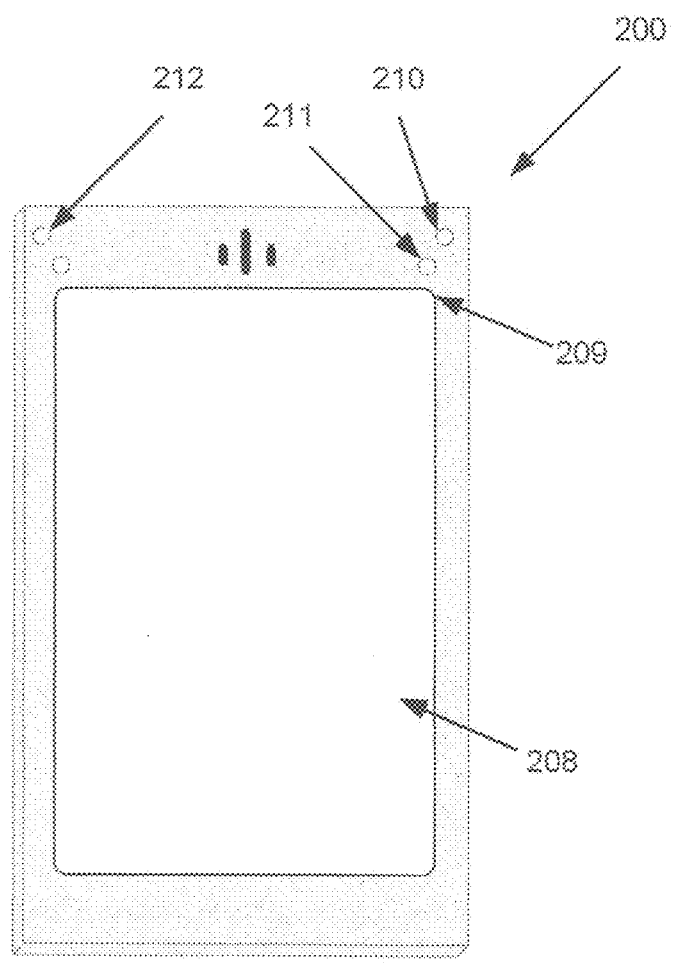
Figure 5B:
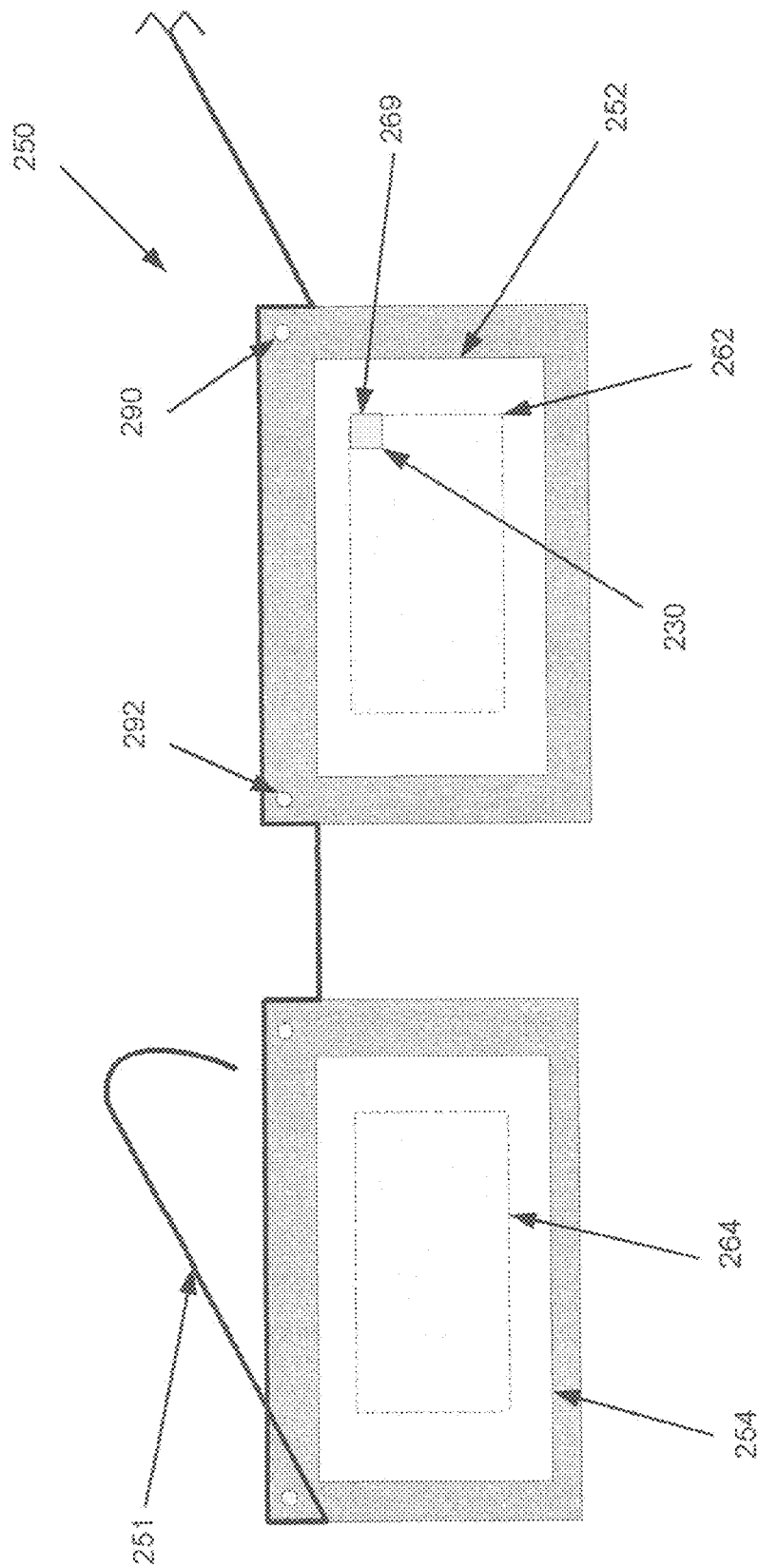
Figure 6A:
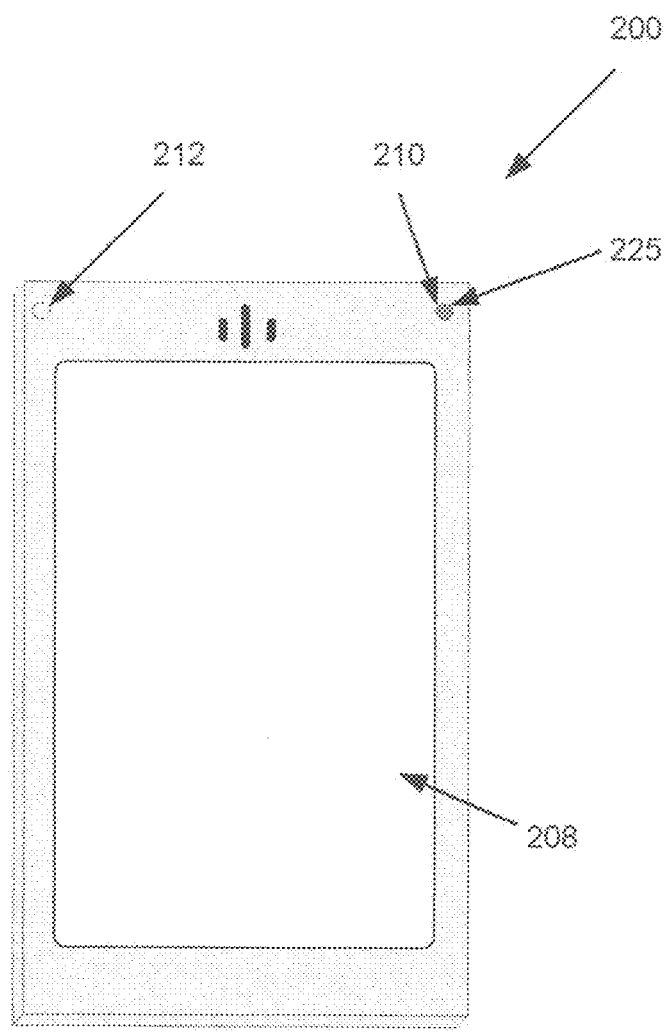
Figure 6B:
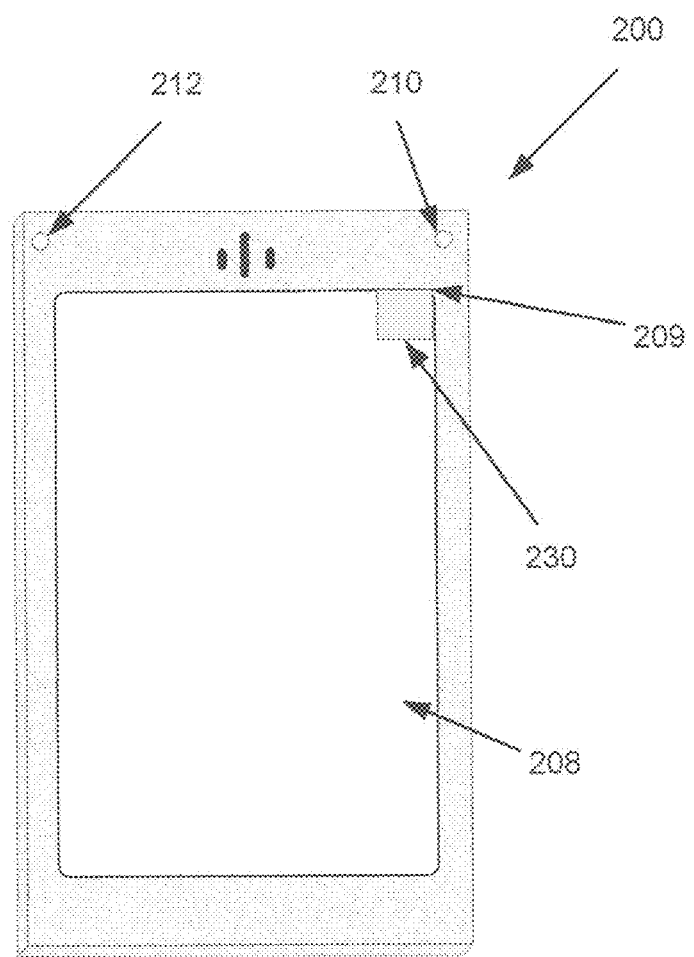
Figure 6C:
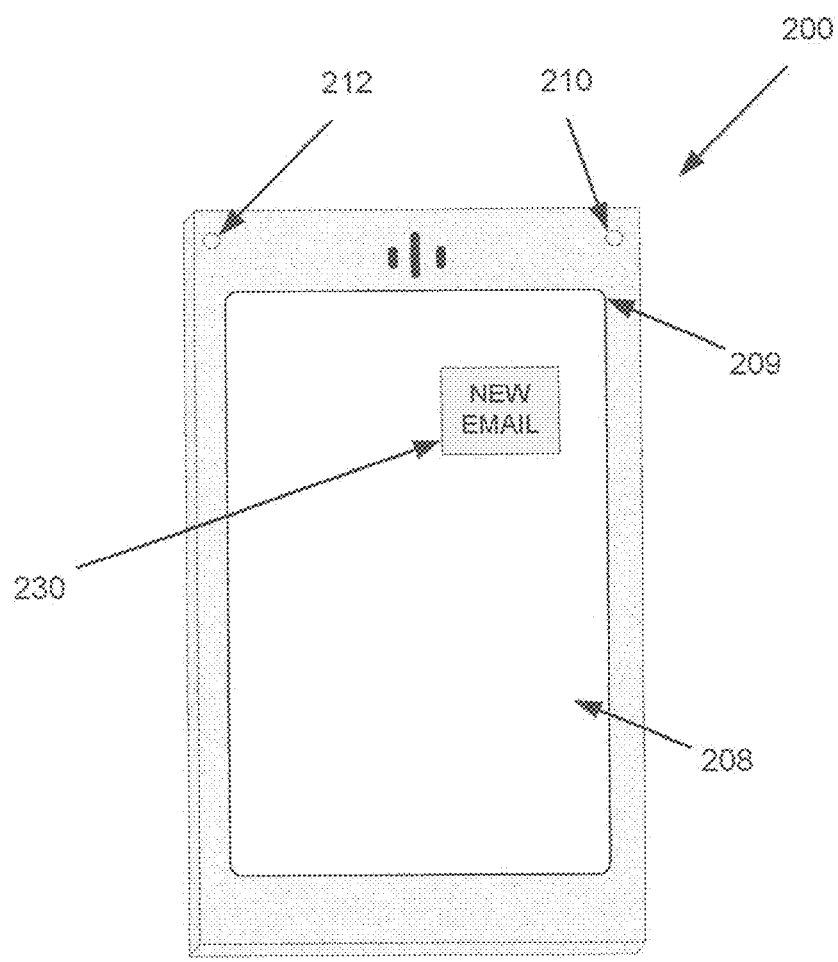
Figure 7B:
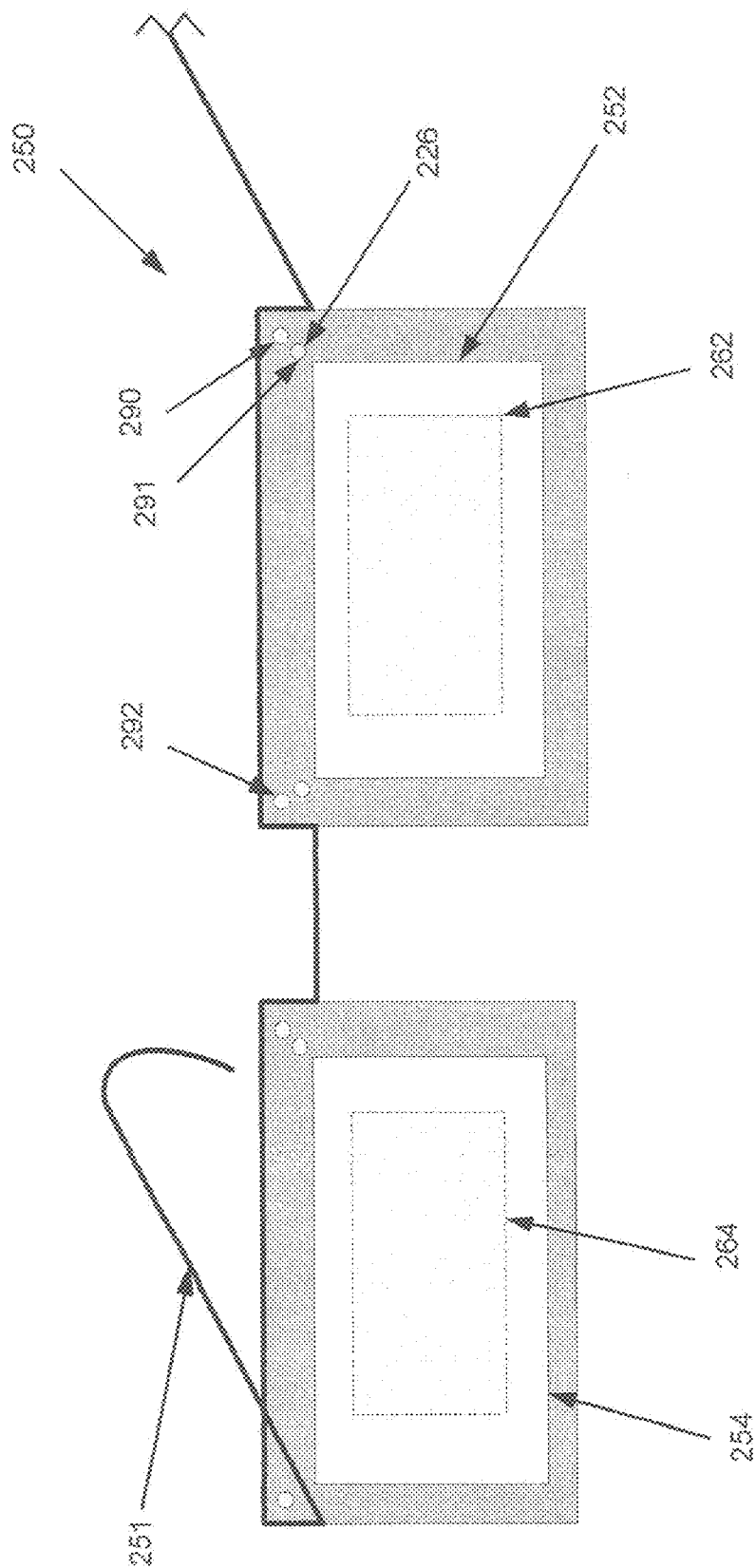
Figure 7C:
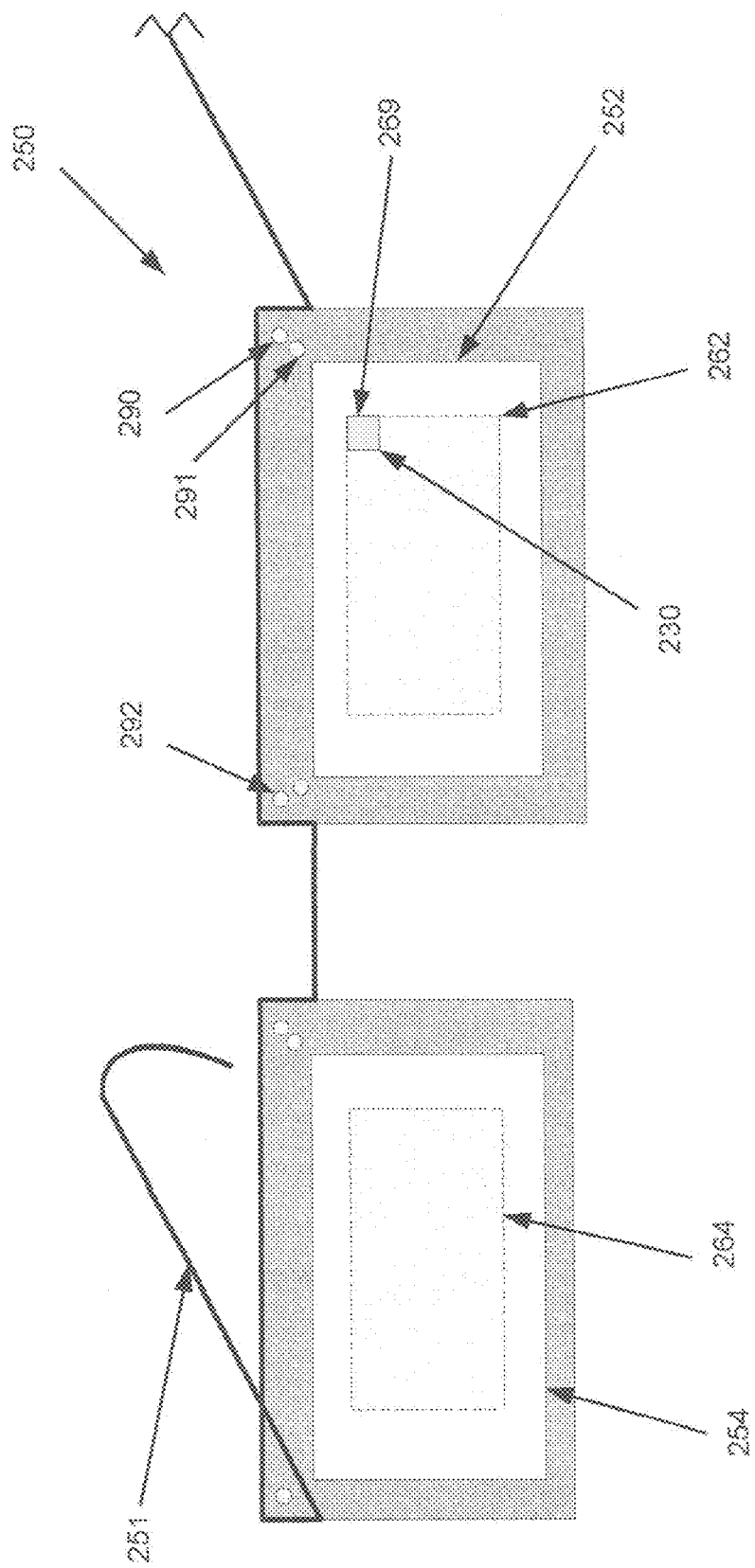
Figure 7D:
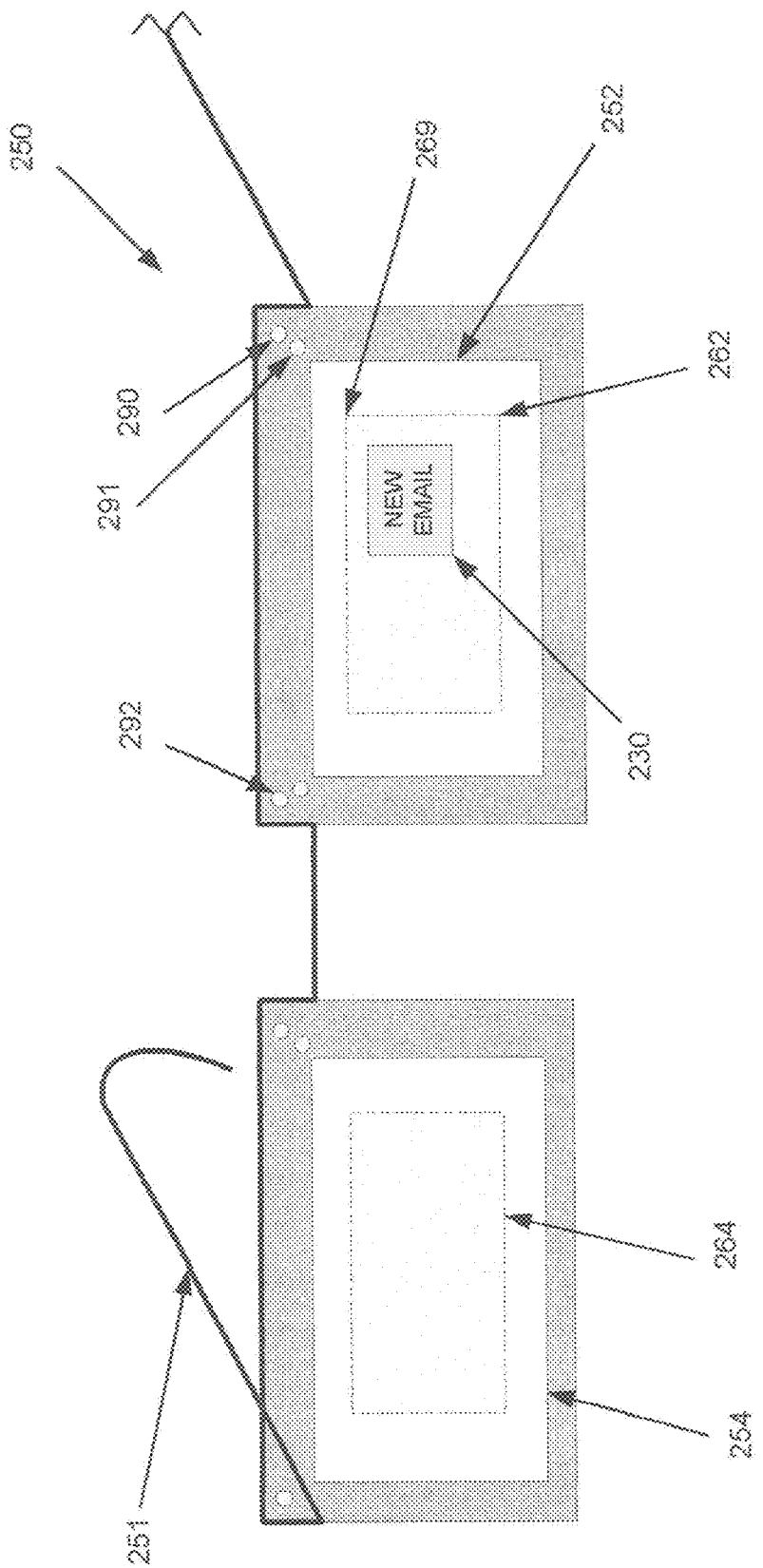
Figure 8:
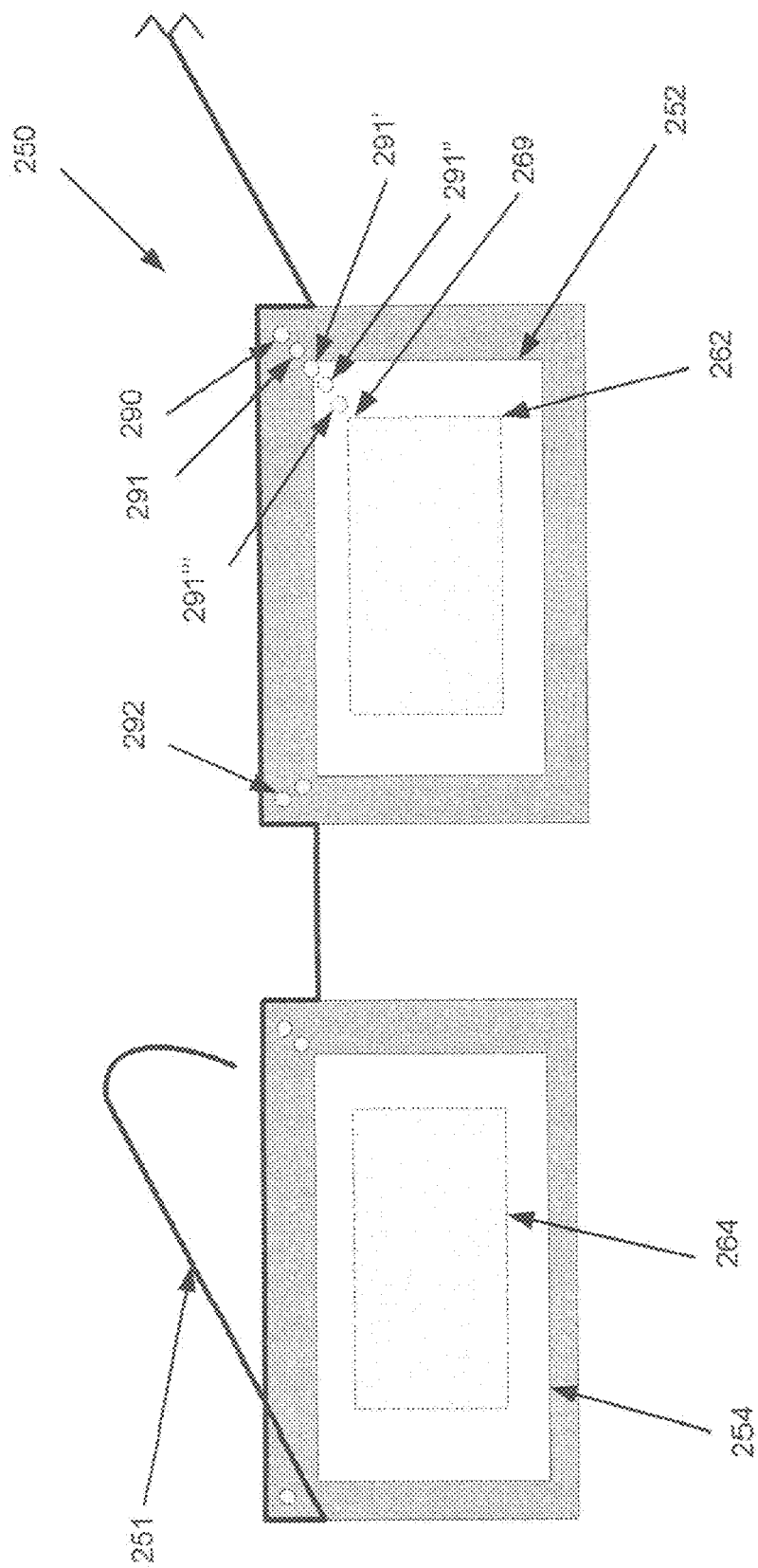
Figure 9:
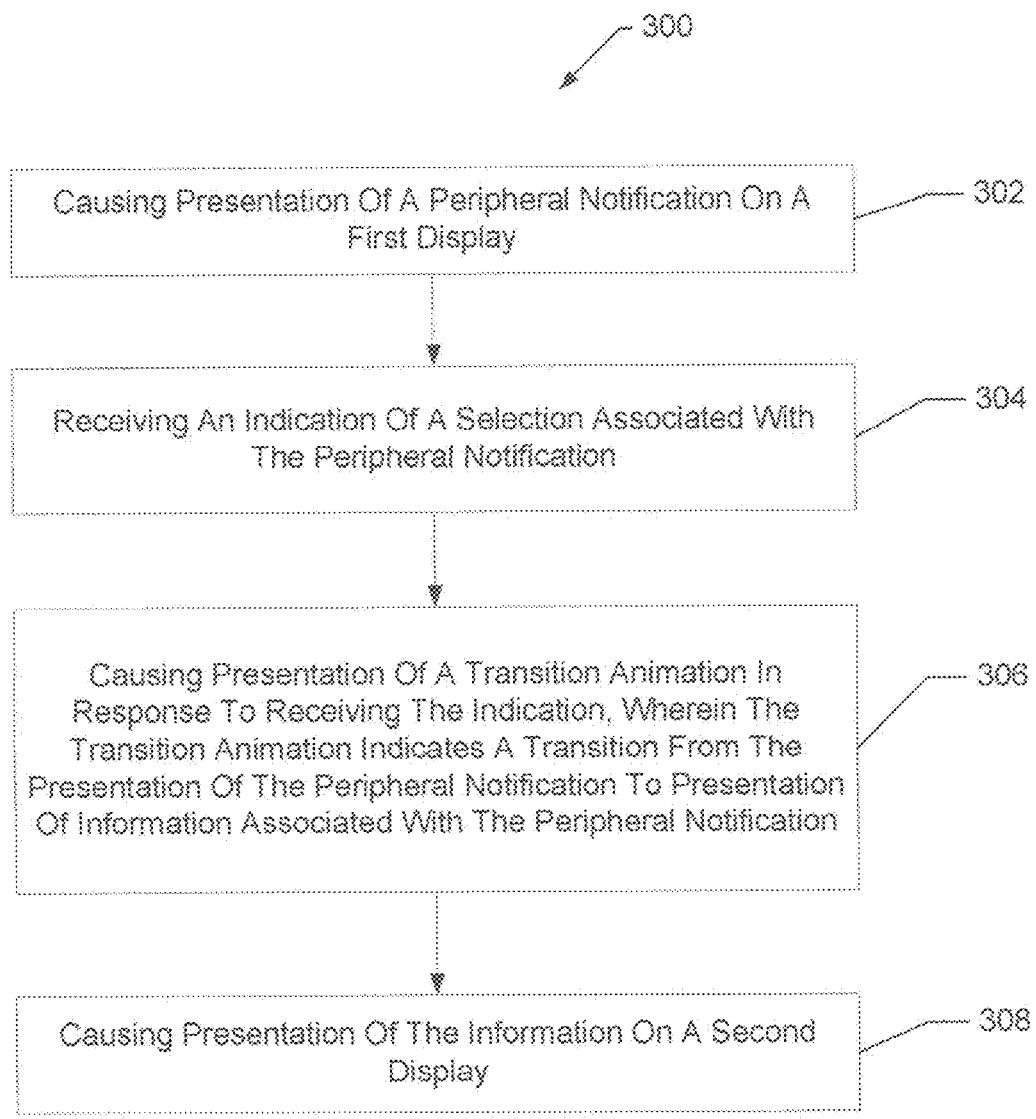
Figure 10:
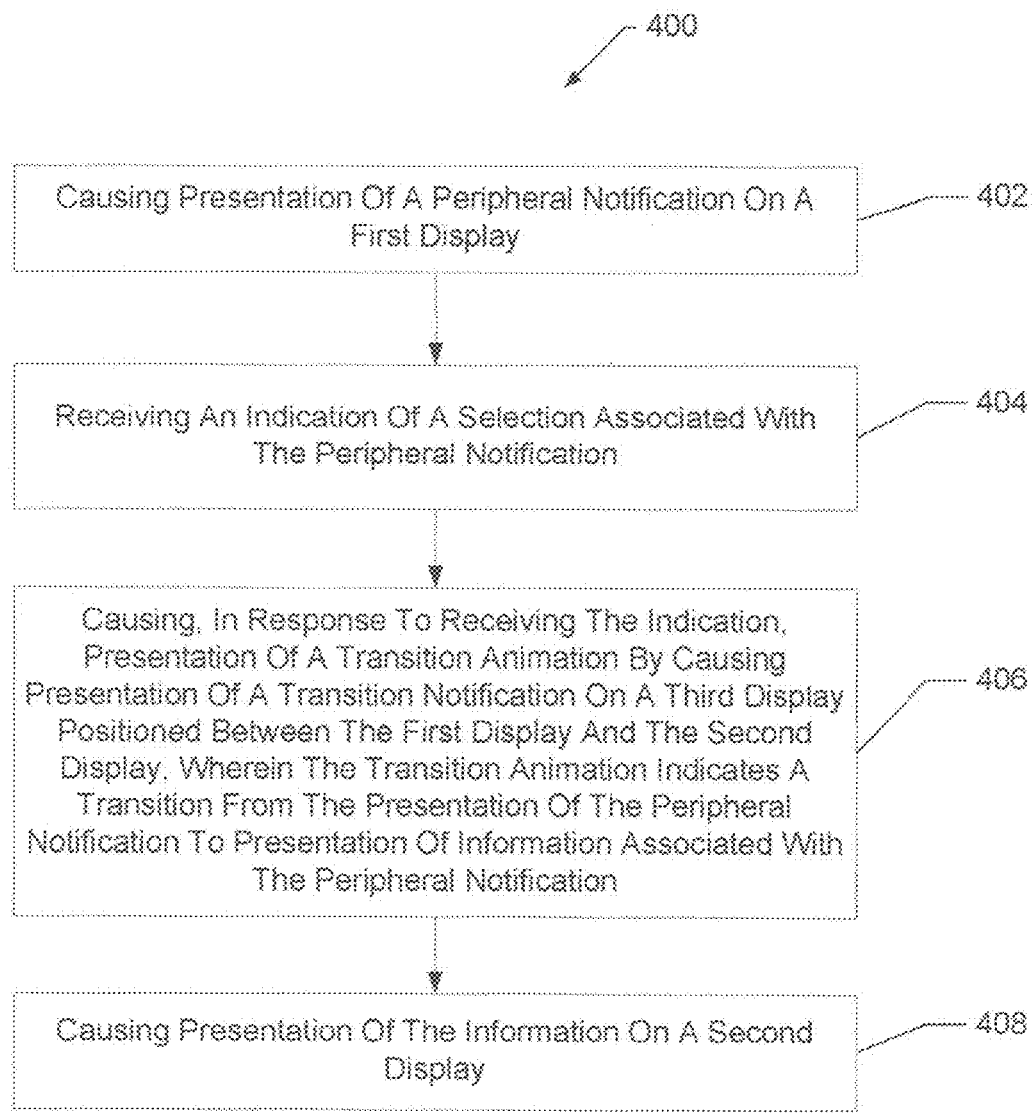

Having thus described embodiments of the invention in general terms, reference will now be made to the accompanying drawings, which are nor necessarily drawn to scale, and wherein:

FIG. 1 illustrates a block diagram of an apparatus with a user interface according to an example embodiment;

FIG. 2 is a schematic block diagram of a mobile terminal according to an example embodiment;

FIG. 3A illustrates an example head-mounted display, wherein the display is pass-through such that a city skyline can be seen through the display, in accordance with an example embodiment of the present invention;

FIG. 3B illustrates an example windshield display for a car, wherein the display is pass-through such that a city skyline can be seen through the display, in accordance with an example embodiment of the present invention;

FIG. 4A illustrates an example device with a main display and a number of peripheral displays, in accordance with an example embodiment described herein;

FIG. 4B illustrates another example head-mounted display with a left lens display, a right lens display, and a number of peripheral displays, in accordance with an example embodiment described herein;

FIG. 5A illustrates another example head-mounted display, wherein a peripheral notification is being presented, in accordance with an example embodiment described herein;

FIG. 5B illustrates the head-mounted display shown in FIG. 5A, wherein a portion of the information is being presented, in accordance with an example embodiment described herein;

FIG. 5C illustrates the head-mounted display shown in FIG. 5A, wherein the information is being presented, in accordance with an example embodiment described herein;

FIG. 6A illustrates another example device, wherein a peripheral notification is being presented, in accordance with an example embodiment described herein;

FIG. 6B illustrates the device shown in FIG. 6A, wherein a portion of the information is being presented, in accordance with an example embodiment described herein;

FIG. 6C illustrates the device shown in FIG. 6A, wherein the information is being presented, in accordance with an example embodiment described herein;

FIG. 7A illustrates the head-mounted display shown in FIG. 4B, wherein a peripheral notification is being presented, in accordance with an example embodiment described herein;

FIG. 7B illustrates the head-mounted display shown in FIG. 7A, wherein a transition notification is being presented, in accordance with an example embodiment described herein;

FIG. 7C illustrates the head-mounted display shown in FIG. 7A, wherein a portion of the information is being presented, in accordance with an example embodiment described herein;

FIG. 7D illustrates the head-mounted display shown in FIG. 7A, wherein the information is being presented, in accordance with an example embodiment described herein;

FIG. 8 illustrates the head-mounted display shown in FIG. 7A, wherein a series of phantom displays are shown to illustrate the illusion of movement of the information from the peripheral display to the right lens display, in accordance with an example embodiment described herein;

FIG. 9 illustrates a flowchart according to an example method for transitioning from presentation of a peripheral notification on a first display to presentation of information on a second display, in accordance with an example embodiment described herein; and FIG. 10 illustrates a flowchart according to another example method for transitioning from presentation of a peripheral notification on a first display to presentation of information on a second display, in accordance with an example embodiment described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein, rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limned to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 for transitioning from presentation of a peripheral notification on a first display to presentation of information on a second display. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating interaction with a user interface, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a display. In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, tor example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs (e.g., applications), which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a pass-through display, a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. The communication interface 114 may additionally be in communication with the memory 112, user interface 116, sensor 118, and/or UI control circuitry 122, such as via a bus.

The sensor 118 may be in communication with the processor 110, user interface 116, and/or UI control circuitry 122. In embodiments wherein the apparatus 102 is embodied as a mobile terminal 10, the sensor 118 may be embodied as or comprise the sensor 18 (shown in FIG. 2). In some embodiments, the sensor 118 may be configured to monitor a user's eyes, such as by tracking a user's gaze, detecting the location and/or focus point of the user's eyes, etc. For example, the sensor 118 may be configured to transmit a beam or other signal (e.g., an infrared light) that bounces off the user's eyes (or eyelids). The sensor 118 may also be configured to receive the return beam or other signal. Additionally or alternatively, the sensor 118 may use other functionality (e.g., pictures and/or video taken with a camera) to monitor the user's eyes (or eyelids). Along these same lines, the sensor 118 may be configured to detect the size of a user's pupil in order to determine the user's focus point in a three-dimensional environment (e.g., depth of the user's focus point). Similarly, the sensor 118 may be configured to monitor other features of the user, such as the degree of movement of the user's gaze, movement of the user's eyelids, among others. In some embodiments, the sensor 118 may comprise a gaze tracker. Additionally or alternatively, in some embodiments the sensor 118 may include other types of sensors, such as proximity sensor, light sensor, gyroscope, camera, heart rate monitor, and/or accelerometer.

In some embodiments, the sensor 118 may provide output (e.g., signals, beams, pictures, videos, etc.) to the processor 110 to enable the processor 110 to determine certain circumstances regarding the user's gaze (e.g., location, focus point, field of vision, etc.). This information may be used to determine any number of characteristics related to a user's eyes. For example, the information may be used to determine that the user's eyes have moved toward a peripheral notification. Along similar lines, the information may be used to determine that the user is indicating user input associated with a peripheral notification.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a sneaker, and/or other input/output mechanisms. In some embodiments, a display may refer to display on a screen, on a wall, on glasses (e.g., near-eye-display), in the air, etc. In some embodiments, the user interface 116 may include more than one display, such as a main display and at least one peripheral display. Along these lines, the user interface 116 may include any number of displays (e.g., main and/or peripheral). In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, sensor 118, and/or UI control circuitry 122, such as via a bus.

In some embodiments, the user interface 116 may comprise a pass-through display. Likewise, in embodiments wherein the apparatus 102 is embodied as a mobile terminal 10, the display 28 may be embodied as a pass-through display. In some embodiments, a pass-through display may be configured to present images (e.g., text, icons, pictures, videos, visual attractants, etc.) in an at least partially transparent form (e.g., image overlay) such that a user may be able to see through the images being presented. Though some example embodiments are described herein with respect to a pass-through display, other user interfaces are contemplated (e.g., presentation screen, projection display, among others).

As such, some example embodiments may provide for an apparatus (e.g., apparatus 102) for providing input through a device comprising a display, such as the glasses 150 shown in FIG. 3A or the car 170 with windshield 175 shown in FIG. 3B. The apparatus with a pass-through display may provide a visual overlay of images on a substantially transparent display surface, such as through lenses that appear to be normal optical glass lenses. This visual overlay allows a user to view objects and people in their typical, un-obscured field of view while providing additional images that may be displayed on the pass-through display. The visual overlay of the images may be of various opacity ranging from transparent (or 0% opacity) to opaque (or 100% opacity). For example, the images presented on the pass-through display may, in some cases, fully occlude the user's vision beyond the display by being presented in a substantially opaque manner on a substantially transparent display. In some embodiments, the presented images may be partially transparent such that the wearer is able to see the environment beyond the pass-through display. The degree of transparency may be variable from fully transparent, where the image is not shown, to fully opaque or non-transparent, or any degree therebetween. Additionally, in some embodiments, the degree of transparency may vary across the entire display.

Example embodiments may also present information that is arranged at the edges of the pass-through display or that include a central area of the display winch is substantially transparent while presenting a less transparent and possibly opaque image around the substantially transparent area. Such an embodiment may allow a user to view their environment while also providing images for the user to view.

Apparatuses with pass-through displays allow for the presentation of two-dimensional (2-D) and three-dimensional (3-D) visual elements. Two-dimensional graphical elements rendered in the plane of the display can present the user with a user interface, status elements, or other images as would be viewed on a typical computer screen or display of a mobile terminal (e.g., display 28 of mobile terminal 10). These 2-D elements can communicate messages, alert the user with a notification, render an application that is currently in use, etc. Further 2-D elements may provide images regarding an object that a user of the pass-through display is viewing through the display, such as by identifying a point-of-interest or landmark that a user is viewing. Such identification may be accomplished by various means including object recognition software or object recognition in conjunction with location identification (e.g., via Global Positioning System (GPS) signals) of the apparatus (e.g., apparatus 102) or the device to which they are in communication, such as mobile terminal 10. Three-dimensional elements can be rendered on top of the environment and seen through the pass-through display to identify objects, provide navigation, etc.

Some examples of apparatuses (e.g., apparatus 102) with a pass-through display are illustrated in FIGS. 3A and 3B. FIG. 3A illustrates an example head-mounted display (e.g., glasses 150) that includes a left lens 154 and a right lens 152. The left lens 154 and right lens 152 may be configured to interact with a user's left and right eye respectively. Additionally, the glasses 150 may include a frame 151 that is configured to engage with a user's head (e.g., ears) to mount to the user's head.

In some embodiments, the glasses 150 may comprise (or be in communication with) a processor (e.g., processor 110) that is configured to control presentation of images. For example, in the depicted embodiment of the glasses 150, the processor may be configured to control presentation of images on a left lens display 164 and a right lens display 162. In some embodiments, the images presented on the left lens display 164 and right lens display 162 may be independent and/or they may be complementary.

As illustrated in FIG. 3A, a user (not shown) may look through the left lens 154 and right lens 152 and the corresponding left lens display 164 and right lens displays 162, respectively, to see information, such as a city skyline 190. Additionally, in some embodiments, the glasses 150 may be configured to cause presentation of images on the left lens display 162 and/or right lens display 164. In the depicted embodiment, the description "CITY SKYLINE" 180 is being presented to the user on the left lens display 164 and right lens displays 162 to indicate that the user is looking at the skyline of the city (e.g., through the left lens 154 and right lens 152). Though words are shown as being presented on the display, embodiments of the present invention contemplate presenting other types of images on the display (e.g., pictures, videos, notifications, visual attractants, etc.). Additionally, though the words shown in FIG. 3A are not transparent, embodiments of the present invention contemplate presentation of at least partially transparent images on the display.

FIG. 3B illustrates an example car 170 with a windshield with a pass-through display. In the depicted embodiment, the car 170 includes a dashboard 172, steering wheel 171, rear-view mirror 173 and windshield 175. The windshield 175 includes a display 176. In some embodiments, an apparatus associated with the car 170 may comprise (or be in communication with) a processor (e.g., processor 110) that is configured to control presentation of images. For example, in the depicted embodiment or the car 170, the processor may be configured to control presentation of images on the display 176 of the windshield 175.

As illustrated in FIG. 3B, a user (not shown) may look through the windshield 175 and the display 176 to see information, such as a city skyline 190. Additionally, in some embodiments, the car 170 may be configured to cause presentation of images on the display 176. In the depicted embodiment, the description "CITY SKYLINE" 180 is being presented to the user on the display 176 to indicate that the user is looking at the skyline of the city (e.g., through the windshield 175). Though words are shown as being presented on the display, embodiments of the present invention contemplate presenting other types of images on the display (e.g., pictures, videos, notifications, visual attractants, etc.). Additionally, though the words shown in FIG. 3A are not transparent, embodiments of the present invention contemplate presentation of at least partially transparent images on the display.

It should also be noted that while FIGS. 3A and 3B each illustrate one example of an apparatus with a pass-through display, numerous other apparatuses configured with a pass-through display are contemplated for embodiments of the present invention (e.g., a helmet visor, a cockpit windshield, etc.). Moreover, embodiments of the present invention are not meant to be limited to apparatuses with pass-through displays, and may be useful with other example apparatuses, such as any apparatus 102 (e.g., mobile terminal 10) described herein (e.g., a mobile computing device, a fixed computing device, etc.).

Returning to FIG. 1, the UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, sensor 118, and/or user interface 116, such as via a bus.

The UI control circuitry 122 may be configured to receive user input from a user interface 116, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a projected capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The apparatus 102, such as through the processor 110, user interface 116, and/or UI control circuitry 122, may be configured to determine that information should be presented to the user. As noted herein, the apparatus 102 may be configured to perform operations (e.g., execute applications, facilitate cellular communication, etc.). In some embodiments, depending on the operation, the apparatus 102 may be configured to present related information, (e.g., a notification regarding the operation) to the user. Fur example, the apparatus 102 may determine that the user has received a new email. In response, the apparatus 102 may determine that the new email and/or a notification regarding the new email, (e.g., information) should be presented to the user.

Though the above depicted example embodiments describe information that may be associated with an operation performed by the apparatus 102, any type of information is contemplated for embodiments of the present invention.

As noted above, some events or operations may be less urgent, less desirable, or less important than others. As such, in some cases, it may be desirable to cause presentation of the corresponding information to be less intrusive such that the user's experience is not interrupted. Additionally, in some cases, the display of the apparatus may be small, such that space for presentation of information is limited. Thus, it may be desirable to not immediately present the information to the user and, instead, present it in a less intrusive manner.

As such, in some embodiments, the apparatus 102 (such as through the processor 110) may be configured to cause presentation of a peripheral notification that may be associated with the information. Along these lines, the apparatus 102 (such as through the processor 110) may be configured to associate the information with a peripheral notification.

In some embodiments, the apparatus 102 (such as through the processor 110, UI control circuitry 122, and/or user interface 116) may be configured to cause presentation of a peripheral notification on a display, such as a peripheral display. In some embodiments, a peripheral display may be a display that is positioned proximate the edge of a main display. For example, in some embodiments, the peripheral display may be significantly smaller than the main display. Additionally, in some embodiments, the main display may be defined as the primary display (e.g., the main display is in the center from the perspective of the user). Along these lines, the peripheral display may be positioned proximate the edge of the main display (e.g., around the periphery of the main display from the perspective of the user). As used herein, the peripheral display may be proximate, e.g., adjacent or spaced apart front one another with a border extending therebetween, either the substrate of the main display or the portion of the main display that actually enables presentation of information. In such a regard, in some embodiments, it may be desirable to have a peripheral display with a small form factor and/or simple logic. Along these lines, the peripheral display may comprise a single input/output display, such as a light-emitting diode (LED).

In some embodiments, the main display may define a second display and the peripheral display may define a first display. Additionally, in some embodiments, the first display (e.g., peripheral display) may be separate from the second display (e.g., main display). Moreover, in some embodiments, the first display (e.g., peripheral display) may be disposed proximate at least one edge of the second display (e.g., main display). Other than where specifically indicated, the terminology of "main" and "peripheral" are not meant to be limiting and are used for clarity of explanation of example embodiments. Along these lines, as may be appreciated by example embodiments described herein, the apparatus 102 may comprise more than one "main" display and/or more than one "peripheral" display. Although the first and second displays may be embodied in various manners, the first display may have a lower resolution than the second display.

For example, FIG. 4A illustrates an example device 200 (e.g., apparatus 102) with a main display 208. In the depicted embodiment the device 200 also includes a plurality of peripheral displays (e.g., displays 210, 211, 212, etc.). The peripheral displays, which are each depicted as a light-emitting diode (LED), are each positioned separate from, but proximate to the display 218 (e.g., the main display). For example, a first peripheral display 210 is positioned proximate a portion 209 of the edge of the main display 208. Additionally, a second peripheral display 211 is positioned between the first peripheral display 210 and the portion 209 of the main display 208.

Similarly, FIG. 4B illustrates an example head-mounted display (e.g., glasses 250) that includes a left lens 254 and a right lens 252. The left lens 254 and right lens 252 may be configured to interact with a user's left and right eye respectively. Additionally, the glasses 250 may include a frame 251 that is configured to engage with a user's head (e.g., ears) to mount to the user's head. The left lens 254 includes a left lens display 264 (e.g., a main display) and the right lens 252 includes a right lens display 262 (e.g., a main display). In the depicted embodiment, the glasses 250 also include a plurality of peripheral displays (e.g., displays 290, 291, 292, etc.). As illustrated, the peripheral displays, winch are each depicted as a light-emitting diode (LED), are each positioned separate from, but proximate to the right lens display 262 and left lens display 264 (e.g., the peripheral displays are positioned on the frame 251). For example, a first peripheral display 290 is positioned proximate a portion 269 of the edge of the right lens display 262 (e.g., a main display). Additionally, a second peripheral display 291 is positioned between the first peripheral display 290 and the portion 269 of the right lens display 262.

Though the above illustrated examples include multiple peripheral displays, embodiments of the present invention contemplate any number peripheral displays, including only one peripheral display. Along these same lines, the position of the peripheral displays on the apparatus may also vary. Indeed, the peripheral display(s) may be positioned in different locations on the apparatus 102 (e.g., below the main display 208 of the device 200 shown in FIG. 4A; on either side of the beam 251 surrounding the right lens display 262 and/or the left lens display 264; etc). Along these same lines, though the above examples are described with respect to a device (e.g., a mobile computing device) and glasses for a head-mounted display, example embodiments of the present invention are not meant to be limited to a mobile computing device and a head-mounted display. Indeed, some embodiments contemplate use with any type of apparatus 102, such as any type of pass-through display or any type of projected display. For example, a windshield of a car may be associated with a pass-through or projected display (e.g., shown in FIG. 3B). In such an example, one or more peripheral displays may be located proximate any edge of the windshield.

In some embodiments, the apparatus 102 (such as through the processor 110, UI control circuitry 122, and/or user interface 116) may be configured to cause presentation of a peripheral notification on a first display. For example, with one reference to FIG. 5A, the apparatus associated with the glasses 250 may present a peripheral notification 225 on a peripheral display 290. In the depicted embodiment, the presentation of the peripheral notification 225 includes emitting a red light from the peripheral display 290. Along similar lines, FIG. 6A illustrates the device 200 presenting a peripheral notification 225 on a peripheral display 210. In the depicted embodiment, the presentation of the peripheral notification 225 includes emitting a red light from the peripheral display 210.

As noted above, the illustrated examples include peripheral displays that each comprise a light-emitting diode (LED). As such, the example peripheral notification includes presentation of a light. However, embodiments of the present invention are not meant to be limited to the above example peripheral notifications presented in FIGS. 5A and 6A, as other peripheral notifications are contemplated. Additionally, though some of the above peripheral notifications are presented in black, white, or red, different colors may be used to aid in presenting the peripheral notification. Additional features (e.g., flashing, blinking, changing colors, etc.) of presenting the peripheral notification are also contemplated by some embodiments of the present invention.

As noted above, the apparatus 102 may be configured to cause presentation of a peripheral notification to indicate to the user that information is available for presenting. For example, a user may receive a new email. However, instead of presenting the user with the new email, or even a message that indicates that there is a new email, the apparatus 102 may be configured to present a peripheral notification associated with the new email (or corresponding notification of a new email). In such a manner, the user may be informed, in a non-intrusive manner, that a new email is available.

Along these lines, an indication of a selection associated with the peripheral notification may be provided. For example, the user may wish to select or provide an indication of a selection associated with the peripheral notification. For example, the user may wish to view the new email notification, or the new email. Thus, in some embodiments, the apparatus 102 (such as through the processor 110, user interface 116, and/or UI control circuitry 122) may be configured to receive an indication, such as user input, indicating selection associated with the peripheral notification. The user input may be any indication of the selection associated with the peripheral notification (e.g., tangible, verbal, passive, etc.). For example, a user may provide an indication to a position on the user interface 116 (e.g., main display, peripheral display, etc.), such as by selecting an icon. Additionally, the user may perform a gesture (e.g., wave their hand, tap on the apparatus, look at the peripheral notification, etc.). Along similar lines, the user may speak a command (e.g., "check email", among others). In such embodiments, the apparatus 102 (such as through the processor 110, sensor 118, user interface 116, and/or UI control circuitry 122) may be configured to receive the user input and determine that the user is indicating a selection associated with the peripheral notification. Although the indication of the selection associated with the peripheral display may be provide by a user, the indication may be provided in other manners. For example, the indication may be provided a predefined period of time following the initial presentation via the peripheral notification, e.g., information associated with the peripheral notification may be provided 10 seconds after the display of the peripheral notification so as to cause the information associated with the peripheral notification to be provided. Alternatively, the information associated with the peripheral notification may be provided following the peripheral notification once a predetermined threshold of urgency, e.g., becomes sufficiently urgent. For example, information associated with the peripheral notification may be provided a predefined person, e.g., a friend, comes with a predetermined distance, e.g., within 100 m.

In some embodiments, the apparatus 102 (such as through the processor 110, user interface 116, and/or UI control circuitry 122) may be configured to cause presentation of information on the second display. As such, the information associated with the peripheral notification may be presented on the second display (e.g., main display). However, as noted above, it may be difficult for a user to discern what information being presented is actually associated with the peripheral notification. For example, some devices may have limited space dedicated for the display. This may be even more exaggerated with head-mounted displays, since the display area of the head-mounted display may be smaller such that it is related to the focus point of the user's eyes (e.g., within a user's foveal vision). An example of this is illustrated in FIG. 4B, which shows a small right lens display 262. Moreover, in addition to information being presented, a user may also be viewing their environment through the display. An example of this is illustrated in FIG. 3A, which illustrates the presented text of "City Skyline" 180 and the environment of the skyline of the city 190 through the right lens display 162. As such, the user encounters a great deal of information with such devices. Therefore, it may be difficult for the user to associate what information is actually associated with a peripheral notification.

As such, embodiments of the present invention seek to control transitioning from presentation of a peripheral notification on a first display to presentation of information on a second display. In some embodiments, the apparatus 102 (such as through the processor 110, user interface 116, and/or UI control circuitry 122) may be configured to cause presentation of a transition animation in response to receiving the indication, e.g., user input, indicating selection associated with the peripheral notification. The transition animation may be any operation (e.g., presentation) that indicates a transition from the presentation of the peripheral notification to presentation of the information associated with the peripheral notification. This transition animation may help the user determine if information being presented is associated with the peripheral notification (e.g., which peripheral notification was selected).

In some embodiments, the apparatus 102 (such as through the processor 110, user interface 116, and/or UI control circuitry 122) may be configured to cause presentation of the transition animation by causing presentation of the information on the second display in an animation series such that the information appears to be moving across the second display. Additionally, the presentation of the information in the animation series may begin from an edge of the second display that is proximate the first display (e.g., the peripheral display that presented the peripheral notification). Moreover, in some embodiments, only a portion of the information may be presented at the edge of the second display and, as the information moves across the second display, more of the information may be presented, until the entire information is presented. In such a regard, the information may appear to be originating from the peripheral notification as it moves across a portion of the apparatus onto and across the second display (e.g., the information may appear to the user to be moving from "off" the second display).

FIGS. 5A, 5B, and 5C illustrate an example transition animation on glasses 250. FIG. 5A shows the apparatus associated with the glasses 250 presenting a peripheral notification 225 on a peripheral display 290. In the depicted embodiment, the peripheral notification 225 is associated with a notification of a new email. FIG. 5B illustrates, at a later time (such as after receiving user input indicating selection associated with the peripheral notification 225), presentation of a portion of the information 230 that begins from an edge 269 of the right lens display 262 (which is proximate the peripheral display 290). FIG. 5C illustrates, at an even later time, presentation of the information 230 in its entire form on the right lens display 262. Indeed, the information 230 includes a message "New Email" that can now be seen by the user. Following the progression from FIG. 5A-5C, the information 230 appears to be moving across the right lens display 262.

FIGS. 6A, 6B, and 6C illustrate an example transition animation on device 200. FIG. 6A shows the device 200 presenting a peripheral notification 225 on a peripheral display 210. In the depicted embodiment, the peripheral notification 225 is associated with a notification of a new email. FIG. 6B illustrates, at a later time (such as after receiving user input indicating selection associated with the peripheral notification 225), presentation of a portion of the information 230 that begins from an edge 209 of the main display 208 (which is proximate the peripheral display 210). FIG. 6C illustrates, at an even later time, presentation of the information 230 in its entire form on the main display 208. Indeed, the information 230 includes a message "New Email" that can now be seen by the user. Following the progression from FIG. 6A-6C, the information 230 appears to be moving across the main display 208.

Though, such as shown with respect to FIG. 5C, some example illustrations of presentation of information herein are only shown on the right lens display 262 of the glasses 250, some embodiments of the present invention contemplate causing presentation of similar (and sometimes the same) information on the left lens display 264. Indeed, the information may be presented in a similar position on the left lens display 264 to account for the perspective of the user. Likewise, some embodiments of the present invention contemplate causing presentation of peripheral notifications and/or transition notifications (described herein) proximate the left lens display 264.

In some embodiments, the apparatus 102 (such as through the processor 110, user interface 116, and/or UI control circuitry 122) may be configured to cause presentation of the information on the second display in the animation series by causing presentation of the information in the animation series such that the information appears to be moving from the first display to the second display. For example, the apparatus 102 may be configured to set the speed at which the information moves across the second display. Along these lines, the apparatus 102 may be configured to set the speed of the movement to be proportional to the distance between the second display and the first display. Additionally, the speed of movement may also account for the space between the first display and second display that is "off" the second display. In such a manner, the information may appear to be moving from the first display to the second display (even though the information is only presented on the second display). Such techniques represent another example transition animation that indicates a transition from the presentation of the peripheral notification to presentation of information associated with the peripheral notification.

While the above examples illustrate some example transition animations contemplated by some embodiments of the present invention, many other types of transition animations are also contemplated. For example, the apparatus 102 may comprise at least one additional peripheral display. Such additional peripheral displays may, in some cases, be used to provide a transition animation. As such, in some embodiments, the apparatus 102 (such as through the processor 110, user interface 116, and/or UI control circuitry 122) may be configured to cause presentation of the transition animation by causing presentation of a transition notification on a third display positioned between the first display and the second display. Additionally, in some embodiments, the apparatus 102 (such as through the processor 110, user interface 116, and/or UI control circuitry 122) may be configured to cause presentation of the information on the second display by causing presentation of the information on the second display after causing presentation of the transition notification on the third display such that transition notification and the information are presented in series leading from the first display to the second display. In such a manner, the additional transition notification may help the user recognize that the information, which is about to be presented, is associated with the peripheral notification. For example, the information may appear to the user to be transitioning from the peripheral notification on the first display to the second display.

Additionally, in some embodiments, the presentation of the information in the animation series may begin from an edge of the second display that is proximate the first display (e.g., the peripheral display that presented the peripheral notification) and/or third display (e.g., the display that presented the transition notification). Moreover, in some embodiments, only a portion of the information may be presented at the edge of the second display and, as the information moves across the second display, more of the information may be presented, until the entire information is presented. In such a regard, the information may appear to be originate from the peripheral notification, move through the transition notification, move through the space "off" the second display, move onto the second display, and move across the second display.

FIGS. 7A, 7B, 7C, and 7D illustrate such an example transition animation on glasses 250. FIG. 7A shows the apparatus associated with the glasses 250 presenting a peripheral notification 225 on a peripheral display 290 (e.g., a first display). In the depicted embodiment, the peripheral notification 225 is associated with a notification of a new email. In the depicted embodiment, the color of the peripheral notification is red (though it may appear as dark grey). FIG. 7B illustrates, at a later time (such as after receiving user input indicating selection associated with the peripheral notification 225), presentation of a transition notification 226 on another peripheral display 291 (e.g., a third display). In the depicted embodiment, the color of the transition notification is yellow (though it may appear as light grey). Though the depicted embodiment illustrates the peripheral notification and transition notification in red and yellow, any color may be used. Along these lines, any indication may be used indicate that either the peripheral notification or the transition notification is "on". In the deplected embodiments of FIG. 7A, the peripheral display 290 lights up to indicate that the peripheral notification is "on". Likewise, in the depicted embodiments of FIG. 7B, the peripheral display 291 lights up to indicate that the transition notification is "on".

FIG. 7C illustrates, at a later time, presentation of a portion of the information 230 that begins from an edge 269 (which is proximate the peripheral displays 290, 291) of the right lens display 262 (e.g., the second display). FIG. 7D illustrates, at an even later time, presentation of the information 230 in its entire form on the right lens display 262. Indeed, the information 230 includes a message "New Email" that can now be seen by the user. Following the progression from FIG. 7A-5D, the information 230 appears to be moving from the peripheral display 290, through the peripheral display 291, and onto and across the right lens display 262.

In some embodiments, the apparatus 102 (such as through the processor 110, user interface 116, and/or UI control circuitry 122) may be configured to cause presentation of the transition notification and the information by causing presentation of the transition notification and the information in a time series with a time interval between the transition notification and the information. In some embodiments, the time interval may be proportionate to a distance between the third display and the second display. In such a regard, with reference to FIG. 7D, the presentation of the information may appear to move at a constant rate across the distance between the first display (e.g., peripheral display 290) and the second display (e.g., right lens display 262). FIG. 8 illustrates such a situation with phantom displays 290', 290", 290'" leading from the peripheral display 291 to the edge 269 of the right lens display 262. In such an embodiment, the transition animation allows the user to easily track the movement of the information from the peripheral notification for easy recognition of the association between the information and the peripheral notification.

Embodiments of the present invention described herein provide for easy recognition of the association between presentation of information and peripheral notifications. Indeed, in some cases, as noted above, the apparatus 102 may include more than one peripheral display and/or more than one grouping of peripheral displays (e.g., FIG. 4B illustrates multiple groupings of peripheral displays, such as peripheral display 290 and 291). In some embodiments, the apparatus 102 may be configured to cause presentation of a peripheral notification on a certain peripheral display or certain grouping of peripheral displays based on what type of information is associated with the peripheral notification. For example, with reference to FIG. 4B, information regarding a notification of a new email may be configured to always present as a peripheral notification on peripheral display 290. Along these same lines, information regarding a notification of a new call may be configured to always present as a peripheral notification on peripheral display 292. In such situations, the user may come to learn the pattern of associations of the information with the peripheral notifications. For example, the user may learn that peripheral notifications from peripheral display 290 are new email notifications and that peripheral notifications from peripheral display 292 are new call notifications. This provides another easy way for a user to associate the information with peripheral notifications.

Additionally, in some embodiments, the peripheral displays may be used for other functionality, such as GPS navigation, showing items of interest (e.g., friends, new restaurants, or shopping deals), or drawing the user's attention to a certain environment feature (e.g., a specific building, a stop sign, etc.).

Embodiments of the present invention provide methods, apparatus and computer program products for transitioning from presentation of a peripheral notification on a first display to presentation of information on a second display. Various examples of the operations performed in accordance with embodiments of the present invention will now be provided with reference to FIGS. 9-10.

FIG. 9 illustrates a flowchart according to an example method for transitioning from presentation of a peripheral notification on a first display to presentation of information on a second display according to an example embodiment 300. The operations illustrated in and described with respect to FIG. 9 may, for example, be performed by, with the assistance of, and/or under the control of one or more of the processor 110, memory 112, communication interface 114, user interface 116, sensor 118, or UI control circuitry 122. Operation 302 may comprise causing presentation of a peripheral notification on a first display. The processor 110, communication interface 114, user interface 116, and/or UI control circuitry 122 may, for example, provide means for performing operation 302. Operation 304 may comprise receiving a an indication, e.g., a user input, of a selection associated with the peripheral notification. The processor 110, sensor 118, user interface 116, communication interface 114, and/or UI control circuitry 122 may, for example, provide means for performing operation 304. Operation 306 may comprise causing presentation of a transition animation in response to receiving the indication, wherein the transition animation indicates a transition from the presentation of the peripheral notification to presentation of information associated with the peripheral notification. The processor 110, user interface 116, and/or UI control circuitry 122 may, for example, provide means tor performing operation 306. Operation 308 may comprise causing presentation of the information on a second display. The processor 110, user interface 116, and/or UI control circuitry 122 may, for example, provide means for performing operation 308.

FIG. 10 illustrates a flowchart according to another example method for transitioning from presentation of a peripheral notification on a first display to presentation of information on a second display according to an example embodiment 400. The operations illustrated in and described with respect to FIG. 10 may, for example, be performed by, with the assistance of, and/or under the control of one or more of the processor 110, memory 112, communication interface 114, user interface 116, sensor 118, or UI control circuitry 122. Operation 402 may comprise causing presentation of a peripheral notification on a first display. The processor 110, communication interface 114, user interface 116, and/or UI control circuitry 122 may, for example, provide means for performing operation 402. Operation 404 may comprise receiving an indication, e.g., a user input, indicating selection associated with the peripheral notification. The processor 110, sensor 118, user interface 116, communication interface 114, and/or UI control circuitry 122 may, for example, provide means for performing operation 404. Operation 406 may comprise causing, in response to receiving the indication, presentation of a transition animation by causing presentation of a transition notification on a third display positioned between the first display and the second display, wherein the transition animation indicates a transition from the presentation of the peripheral notification to presentation of information associated with the peripheral notification. The processor 110, user interface 116, and/or UI control circuitry 122 may, for example, provide means for performing operation 406. Operation 408 may comprise causing presentation of the information on a second display. The processor 110, user interface 116, and/or UI control circuitry 122 may, for example, provide means for performing operation 408.

FIGS. 9-10 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
causing, by a processor, presentation of a peripheral notification on a first display;
receiving an indication of a selection associated with the peripheral notification;
causing presentation of a transition animation in response to receiving the indication, wherein the transition animation indicates a transition from the presentation of the peripheral notification to presentation of information associated with the peripheral notification; and
causing presentation of the information on a second display,
wherein causing presentation of the transition animation comprises causing presentation of the information on the second display in an animation series such that the information appears to be moving across the second display such that the information appears to be moving from the first display to the second display, wherein presentation of the information in the animation series begins from a point proximate a corner of the second display,
wherein causing presentation of the transition animation comprises causing presentation of a transition notification on a third display positioned between the first display and the second display,
wherein the first display, the second display, and the third display are physically separate, and
wherein the first display is disposed proximate the corner of the second display.

2. The method according to claim 1, wherein the second display comprises a pass-through display, and wherein the first display comprises a display of lower resolution than the second display.

3. The method according to claim 1, wherein causing presentation of the information on the second display comprises causing presentation of the information on the second display after causing presentation of the transition notification on the third display such that transition notification and the information are presented in series leading from the first display to the second display.

4. The method according to claim 3, wherein causing presentation of the transition notification and the information comprises causing presentation of the transition notification and the information in a time series with a time interval between the transition notification and the information, wherein the time interval is proportionate to a distance between the third display and the second display.

5. An apparatus comprising a processor and a memory including computer program code, the memory and the computer program code configured to, with the processor, cause the apparatus to:
cause presentation of a peripheral notification on a first display;
receive an indication of a selection associated with the peripheral notification;
cause presentation of a transition animation in response to receiving the indication, wherein the transition animation indicates a transition from the presentation of the peripheral notification to presentation of information associated with the peripheral notification; and
cause presentation of the information on a second display,
wherein causing presentation of the transition animation comprises causing presentation of the information on the second display in an animation series such that the information appears to be moving across the second display such that the information appears to be moving from the first display to the second display, wherein presentation of the information in the animation series begins from a point proximate a corner of the second display,
wherein causing presentation of the transition animation comprises causing presentation of a transition notification on a third display positioned between the first display and the second display,
wherein the first display, the second display, and the third display are physically separate, and
wherein the first display is disposed proximate the corner of the second display.

6. The apparatus of claim 5, wherein the second display comprises a pass-through display, and wherein the first display comprises a display of lower resolution than the second display.

7. The apparatus of claim 5, wherein the memory and the computer program code are further configured to, with the processor, cause the apparatus to cause presentation of the information on the second display by causing presentation of the information on the second display after causing presentation of the transition notification on the third display such that transition notification and the information are presented in series leading from the first display to the second display.

8. The apparatus of claim 7, wherein the memory and the computer program code are further configured to, with the processor, cause the apparatus to cause presentation of the transition notification and the information by causing presentation of the transition notification and the information in a time series with a time interval between the transition notification and the information, wherein the time interval is proportionate to a distance between the third display and the second display.

9. Computer program product comprising a non-transitory computer readable medium having program code portions stored thereon, the program code portions being a computer readable medium and configured when said program product is run on a computer or network device, to:
cause presentation of a peripheral notification on a first display;
receive an indication of a selection associated with the peripheral notification;
cause presentation of a transition animation in response to receiving the indication, wherein the transition animation indicates a transition from the presentation of the peripheral notification to presentation of information associated with the peripheral notification; and
cause presentation of the information on a second display,
wherein causing presentation of the transition animation comprises causing presentation of the information on the second display in an animation series such that the information appears to be moving across the second display such that the information appears to be moving from the first display to the second display, wherein presentation of the information in the animation series begins from a point proximate a corner of the second display,
wherein causing presentation of the transition animation comprises causing presentation of a transition notification on a third display positioned between the first display and the second display,
wherein the first display, the second display, and the third display are physically separate, and
wherein the first display is disposed proximate the corner of the second display.

* * * * *